(12) United States Patent
Xie

(10) Patent No.: US 12,382,947 B2
(45) Date of Patent: Aug. 12, 2025

(54) AI INTELLIGENT SOUND WAVE PULSE RESONANCE MOUSE REPELLER AND MOUSE REPELLENT METHOD

(71) Applicant: Lihai Xie, Shaoyang (TW)

(72) Inventor: Lihai Xie, Shaoyang (TW)

( * ) Notice: Subject to any disclaimer, the term of this patent is extended or adjusted under 35 U.S.C. 154(b) by 0 days.

(21) Appl. No.: 18/596,980

(22) Filed: Mar. 6, 2024

(65) Prior Publication Data

US 2024/0306631 A1    Sep. 19, 2024

(30) Foreign Application Priority Data

Mar. 13, 2023  (CN) .......................... 202310232341.0

(51) Int. Cl.
| | |
|---|---|
| *A01M 29/18* | (2011.01) |
| *H02M 7/537* | (2006.01) |
| *H04R 1/02* | (2006.01) |
| *H04R 3/04* | (2006.01) |

(52) U.S. Cl.
CPC ............ *A01M 29/18* (2013.01); *H02M 7/537* (2013.01); *H04R 1/028* (2013.01); *H04R 3/04* (2013.01); *A01M 2200/00* (2013.01)

(58) Field of Classification Search
CPC .................................................... A01M 29/18
See application file for complete search history.

(56) References Cited

U.S. PATENT DOCUMENTS

| | | | | |
|---|---|---|---|---|
| 3,838,418 A | * | 9/1974 | Brown .................. | G10K 15/02 340/384.2 |
| 3,893,106 A | * | 7/1975 | Schulein ............... | A01M 29/18 340/384.2 |
| 4,965,552 A | * | 10/1990 | Price .................. | G08B 13/1672 340/573.2 |
| 6,847,515 B1 | * | 1/2005 | Kelley ................ | H01H 47/043 361/115 |
| 2012/0286942 A1 | * | 11/2012 | Wu ....................... | A01M 29/18 340/384.2 |

(Continued)

FOREIGN PATENT DOCUMENTS

| | | |
|---|---|---|
| CN | 2865291 Y | 2/2007 |
| CN | 201274725 Y | 7/2009 |

(Continued)

*Primary Examiner* — Christopher D Hutchens

(74) *Attorney, Agent, or Firm* — JEEN IP LAW, LLC

(57) ABSTRACT

An AI intelligent sound wave pulse resonance mouse repeller and a mouse repellent method are provided, the mouse repeller includes an AI intelligent chip, a power converter, an indicator light, and an ultrasonic horn. The AI chip can freely generate a high-speed and ultra-high frequency pulse wave with random changes, can perform AI calculation with environmental sound, and then perform random scanning. A generated pulse signal resonates with a sound frequency of animals such as mice and bats, is superimposed with a sound wave to achieve state pulses that are tens or even hundreds of times stronger for stimulation and interference, effectively disrupting and stimulating an auditory system of rodents, making them intolerable, feeling panicked and uneasy, and exhibiting symptoms such as loss of appetite, escape, and even convulsions, can achieve a goal of driving the rodent out of their range of activity.

13 Claims, 8 Drawing Sheets

(56) References Cited

U.S. PATENT DOCUMENTS

| | | | | |
|---|---|---|---|---|
| 2015/0198500 A1* | 7/2015 | Komninos | ............ | G01M 3/24 |
| | | | | 381/56 |
| 2016/0338337 A1* | 11/2016 | Waldman | ............ | A01M 29/18 |
| 2017/0280701 A1* | 10/2017 | Teh | ............ | A01M 29/18 |
| 2020/0323193 A1* | 10/2020 | King | ............ | G06V 10/776 |

FOREIGN PATENT DOCUMENTS

| | | | | | |
|---|---|---|---|---|---|
| CN | 201774907 U | | 3/2011 | | |
| CN | 111820206 A | * | 10/2020 | | |
| CN | 112418052 A | * | 2/2021 | | |
| WO | WO-2017017451 A1 | * | 2/2017 | ............ | A01M 29/18 |

* cited by examiner

AI INTELLIGENT SOUND WAVE PULSE RESONANCE MOUSE REPELLER AND MOUSE REPELLENT METHOD

CROSS-REFERENCE TO RELATED APPLICATIONS

This application claims priority to Chinese Patent Application No. 202310232341.0, filed on Mar. 13, 2023, which is hereby incorporated by reference in its entirety.

TECHNICAL FIELD

The present disclosure relates to the field of mouse repeller technologies, and in particular, to an AI intelligent sound wave pulse resonance mouse repeller and a mouse repellent method.

BACKGROUND

Traditional mouse repellers use a speaker to produce a sound or a flashing light to drive away mice. The sound and lighting method are fixed and unchanged, with low sound and brightness. After long-term operation, the mouse will develop habitual immunity to the current method, rendering the repellent effect useless.

After searching, it was found that in some existing technologies, such as: (1) patent number of 200820210547.4, a sweeping frequency ultrasonic and acoustic mouse repeller; (2) 200520133103.1, an ultrasonic electronic mouse repeller; (3) 201020502965.8, an electronic insect repeller and an electronic mouse repeller, most of which emit electromagnetic waves or ultrasonic waves to expel mice, due to their limited functionality, the electromagnetic waves or ultrasonic waves emitted are fixed frequencies, and if used for a long time, it can cause pests such as mice to develop "adaptability" and "immunity", losing an effect of mouse repellent effect.

Moreover, most of the current sound wave type mouse repellers can only serve simple expelling purposes and cannot physically harm a driven object, resulting in poor expelling effects.

SUMMARY

In response to the above issues, the present disclosure provides an AI intelligent sound wave pulse resonance mouse repeller and a mouse repellent method. An AI chip can freely generate a high-speed, ultra-high frequency pulse wave with random changes, effectively interfering and stimulating an auditory system of rodents, making them unable to tolerate, feeling panicked and uneasy, exhibiting symptoms such as loss of appetite, escape, and even convulsions. This can achieve a goal of driving the rodent out of their range of activity, causing a certain physical damage to a driven object, and improving a driving effect.

The present disclosure proposes an AI intelligent sound wave pulse resonance mouse repeller, including: an AI intelligent chip; a power converter connected to the AI intelligent chip, and configured to provide power support; a controller connected to the AI intelligent chip, and configured to control a working mode; an indicator light, configured to indicate a working state; and an ultrasonic horn connected to the AI intelligent chip, and configured to emit a sound wave pulse; the ultrasonic horn includes a sound wave collector and a sound wave resonator; the sound wave collector collects environmental information and sends it to the AI intelligent chip for calculation; the sound wave resonator is connected to the AI intelligent chip and outputs a high-frequency pulse that resonates with a driven object in space based on a calculation result of the AI intelligent chip.

In an embodiment of the present disclosure, the AI intelligent chip is provided with a power filtering unit, a program download port is connected to the power filtering unit; the AI intelligent chip is provided in a casing.

In an embodiment of the present disclosure, the power converter includes: a connected rectifier bridge, an overvoltage and surge protection circuit, a switch voltage reduction circuit, and a voltage stabilization circuit; the voltage stabilizing circuit is connected to the AI intelligent chip.

In an embodiment of the present disclosure, the controller switches the working state of the AI intelligent chip with a patch type button.

In an embodiment of the present disclosure, the indicator light includes a red LED light and a blue LED light for indicating different working states of the AI intelligent chip.

In an embodiment of the present disclosure, the casing includes a shell; a shell cover connected to a top of the shell; the power converter and the controller are both provided in the shell, the ultrasonic horn and the indicator light are provided at a top of the shell cover.

On the other hand, the present disclosure proposes a mouse repellent method of the AI intelligent sound wave pulse resonance mouse repeller, which includes: turning on a controller to start an AI intelligent chip and an ultrasonic horn; collecting environmental information through a sound wave collector and sending it to the AI intelligent chip; performing calculation on a collected information, by the AI intelligent chip, outputting a result; outputting a high-frequency pulse that resonates with a driven object in space, by a sound wave resonator, according to a calculation result.

In an embodiment of the present disclosure, the AI intelligent chip is provided with an information computing program. A frequency of the high-frequency pulse is between 30 KHZ-65 KHZ, which is much higher than a frequency range of human activities and does not cause any harm or interference to human life.

The beneficial effects of the present disclosure are:
the present disclosure mainly adopts AI frequency conversion sound wave pulse resonance technology. The AI chip can freely generate a high-speed and ultra-high frequency pulse wave with random changes, can perform AI calculation with environmental sound, and then perform random scanning. A generated pulse signal resonates with a sound frequency of animals such as mice and bats, is superimposed with sound waves to achieve state pulses that are tens or even hundreds of times stronger for stimulation and interference, thereby effectively disrupting and stimulating an auditory system of rodents, making them intolerable, feeling panicked and uneasy, exhibiting symptoms such as loss of appetite, escape, and even convulsions, can achieve a goal of driving rodent out of their range of activity, causing a certain physical damage to a driven object, and improving a driving effect.

BRIEF DESCRIPTION OF DRAWINGS

In order to provide a clearer explanation of the embodiments of the present disclosure or the technical solutions in the prior art, a brief introduction will be made to the drawings required in the embodiments or description of the prior art. It is obvious that the drawings in the following description are some embodiments of the present disclosure.

Numeral reference: 100. AI intelligent chip; 200. Power converter; 300. Controller; 400. Indicator light; 401. Red LED light; 402. Blue LED light; 500. Ultrasonic horn; 501. Sound wave collector; 502. Sound wave resonator; 600. Casing; 601. Shell; 602. Shell cover.

DESCRIPTION OF EMBODIMENTS

In order to clarify the purpose, technical solution, and advantages of the embodiments of the present disclosure, the following will provide a clear and complete explanation of the technical solution in the embodiments of the present disclosure in combination with the drawings. Obviously, the described embodiments are a part of the embodiments of the present disclosure, not all of them. Based on the embodiments in the present disclosure, all other embodiments obtained by ordinary technicians in the art without creative work fall within the protection scope of the present disclosure.

An AI intelligent sound wave pulse resonance mouse repeller provided in the embodiments of the present disclosure is suitable for rodent repellent, insect repellent, mosquito repellent, cockroach repellent, pest repellent, etc. in various scenarios (such as small or large warehouses, grain depots, cold storage, supermarkets, farms, garages, etc.). In this embodiment, an example is given to illustrate an application scenario of mouse repellent. The details are as follows.

Figure 1:
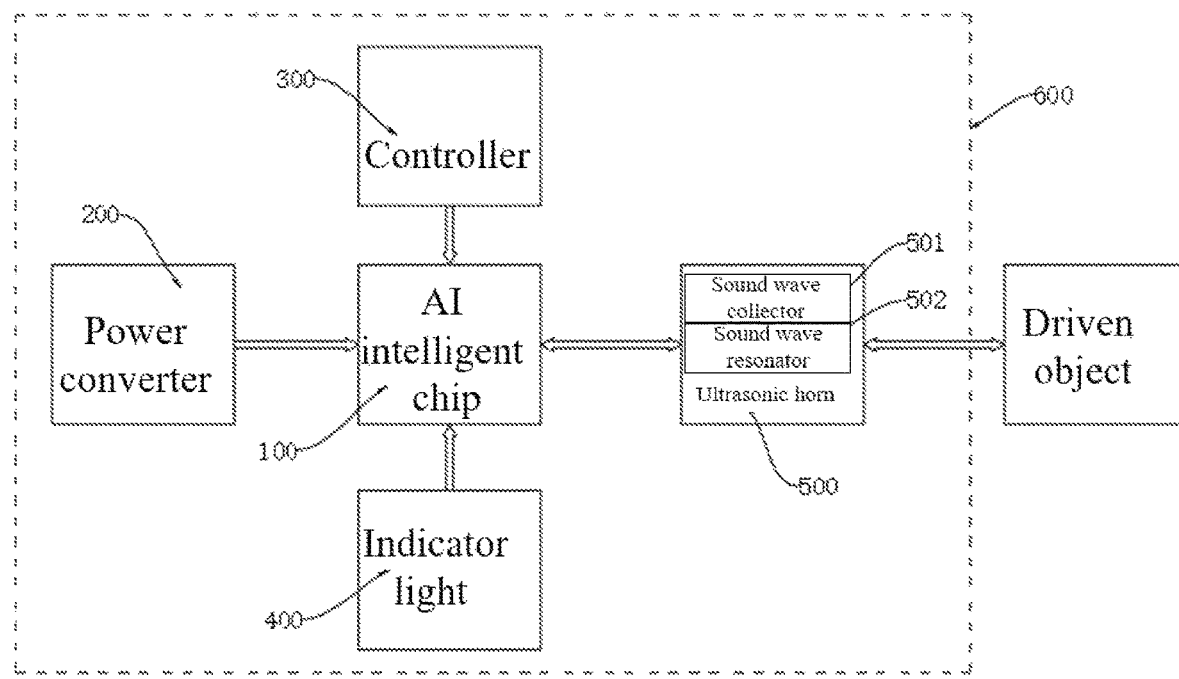
FIG. 1 shows a schematic diagram of an AI intelligent sound wave pulse resonance mouse repeller according to an embodiment of the present disclosure.

Please refer to FIG. 1, which illustrates a schematic diagram of the AI intelligent sound wave pulse resonance mouse repeller according to an embodiment of the present disclosure.

The AI intelligent sound wave pulse resonance mouse repeller proposed in this embodiment mainly adopts AI variable frequency sound wave pulse resonance technology. The AI chip can freely generate randomly changing high-speed ultra-high frequency pulse waves, and can perform AI calculation with environmental sound, and then perform random scanning. A generated pulse signal resonates with a sound frequency of animals such as mice and bats, and is superimposed with sound waves, so as to achieve super strong state pulses that can stack up to tens or even hundreds of times for stimulation and interference.

Specifically, the above-mentioned AI intelligent sound wave pulse resonance mouse repeller includes: an AI intelligent chip 100, a power converter 200, a controller 300, an indicator light 400, and an ultrasonic horn 500.

Figure 5:
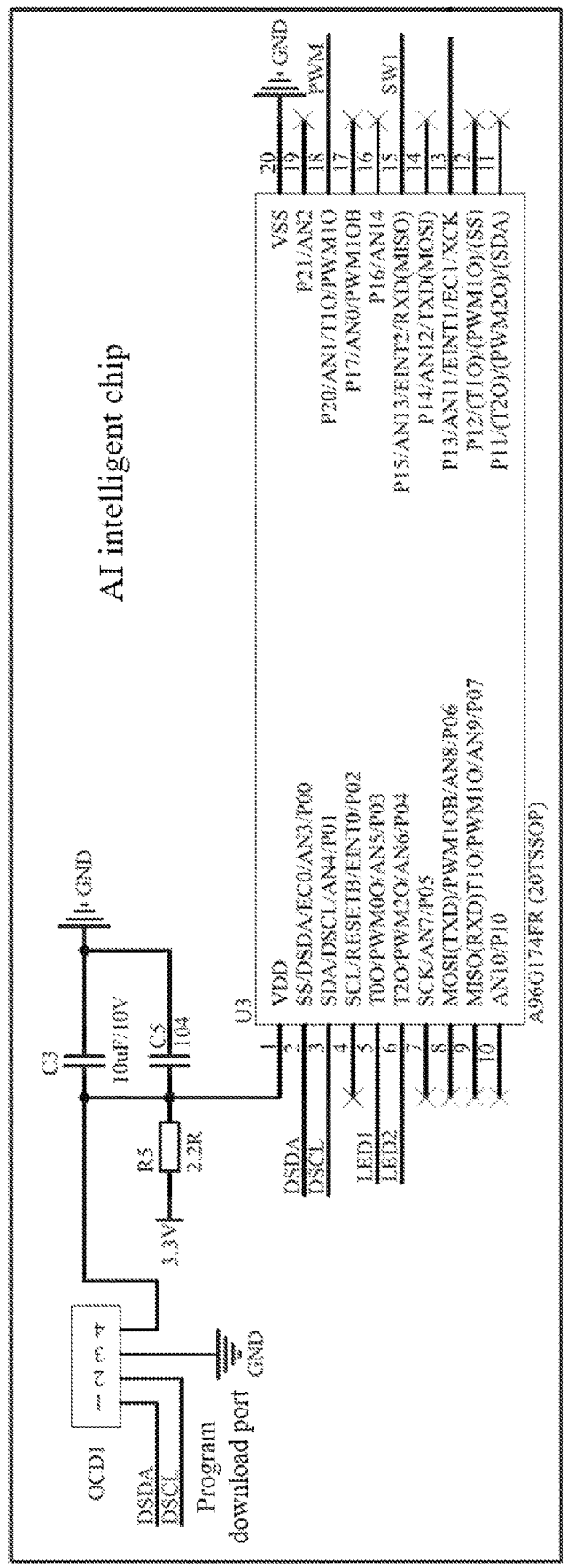
FIG. 5 shows a circuit diagram of an AI intelligent chip in an embodiment of the present disclosure.

For example, the AI intelligent chip 100 uses imported AI intelligent chips to perform an interactive calculation on sound waves and input/output information exchange. The AI intelligent chip 100 is provided with an information calculation program. The AI intelligent chip U3 is a modern A96G174RF. OCD1 is used for programming AI chips. R5, C3, C5, used for power filtering of AI intelligent chips, as shown in a circuit diagram of the AI intelligent chip in FIG. 5.

In other embodiments, the AI intelligent chip includes multiple memory bare chips for storing data; the multiple bare chips perform operations included in AI processing; and a system chip, configured to control the multiple memory chips and multiple memory bare chips. A required number of memory bare chips can be stacked when a storage capacity is required, a required number of operational bare chips can be stacked when computing power is required. That is to say, a performance of the AI chip can be easily changed in a scalable manner. Therefore, it is possible to simply improve a processing power of the AI chip.

Figure 3:
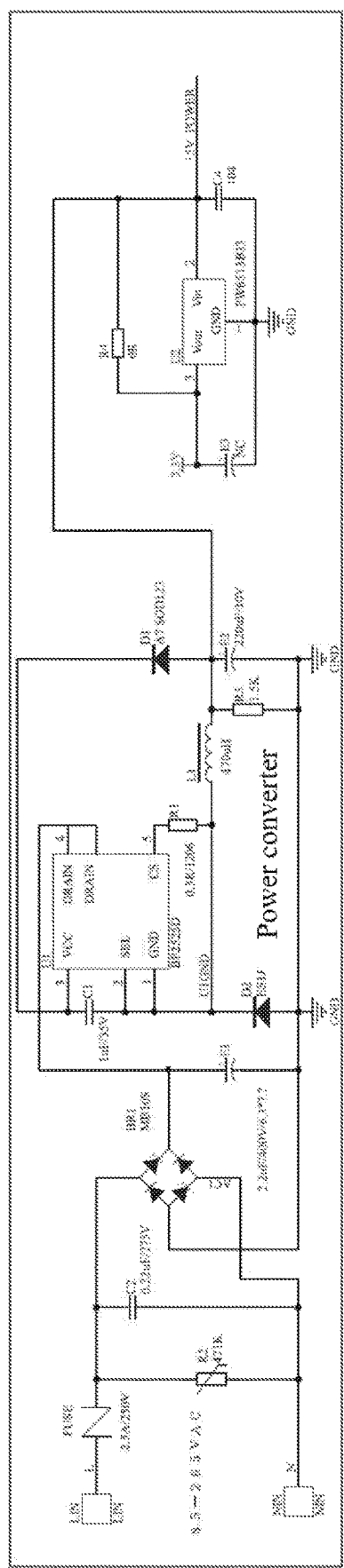
FIG. 3 shows a circuit diagram of a power converter in an embodiment of the present disclosure.

Referring to FIG. 3, FIG. 3 illustrates a circuit diagram of the power converter in an embodiment of the present disclosure.

For example, in this embodiment, the power converter 200 is mainly configured to provide power support to the AI intelligent chip 100. Specific steps are as follows:
(1) converting 85-265V AC power into 5V DC power supply.
(2) 85-265V AC power passes through FUSE to rectifier bridge BR1, FUSE, R2, C2 to form power input overvoltage and surge protection.
(3) The rectifier bridge BR1 rectifies the 85-265V AC power into approximately 150-300V DC, which is then filtered by E1 and sent to switching power supply chip U1, which is BP2525D.
(4) U1, C1, D2, R1, L1, R3, D1, E2 form a switch voltage reduction circuit, which converts the DC voltage from around 150-300V to around 5V.
(5) A high-precision power supply composed of voltage stabilizing circuits U2, C4, and E4 stabilizes the input 3.3V DC voltage to power the AI intelligent chip.

In other embodiments, such as outdoor use, a photovoltaic panel module can be used for power supply. Specifically, a photovoltaic panel component includes a non-silicon crystalline photovoltaic panel, a supercapacitor, and a voltage stabilizing chip. The supercapacitor is charged through a non-silicon crystalline material photovoltaic panel, output a 3.3V DC voltage to the AI intelligent chip after being stabilized by the voltage stabilizing chip.

In addition, the photovoltaic panel module can also be replaced by other components, and their specific working principles and connection methods are relatively mature in existing technology, which will not be elaborated here.

Figure 4:
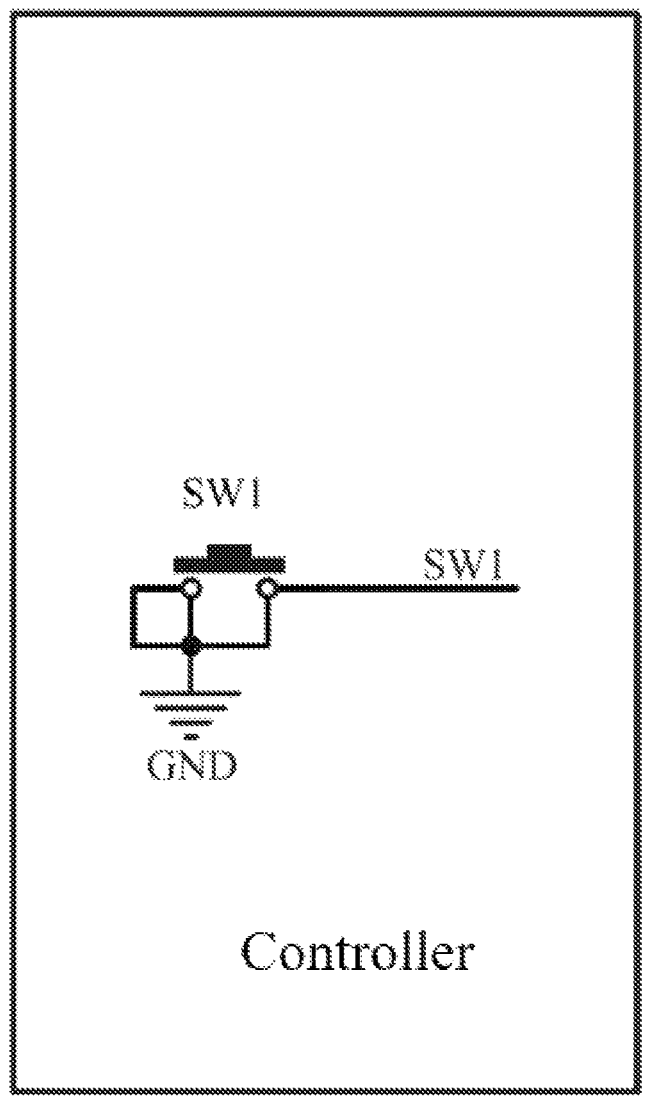
FIG. 4 shows a circuit diagram of a controller according to an embodiment of the present disclosure.

Referring to FIG. 4, FIG. 4 illustrates a circuit diagram of the controller in this embodiment.

For example, the controller SW1 in this embodiment switches a working state of the mouse repeller with a patch type button. The controller can be a logic input switch used to adapt a logic input to an output technology of a programmable controller. If the logic output of the digital output module of PLC is output by a PNP transistor, factory set source of SW1 needs to be used. If the logic of a digital output module of the PLC is output by the NPN transistor, an internal power supply SW1 is changed to Sinkint. If the logic output of the digital output module of the PLC is outputted by a relay, there is no hard requirement for the setting of SW1.

In other embodiments, a step of scanning and monitoring a touch operation of a switch button through switch button scanning includes: scanning and monitoring a communication frame generated by the touch operation of the switch button through switch button scanning, the communication frame includes an invalid communication frame, a switch operation communication frame, and a linkage operation communication frame, which is controlled by the SW controller for operation.

Figure 7:
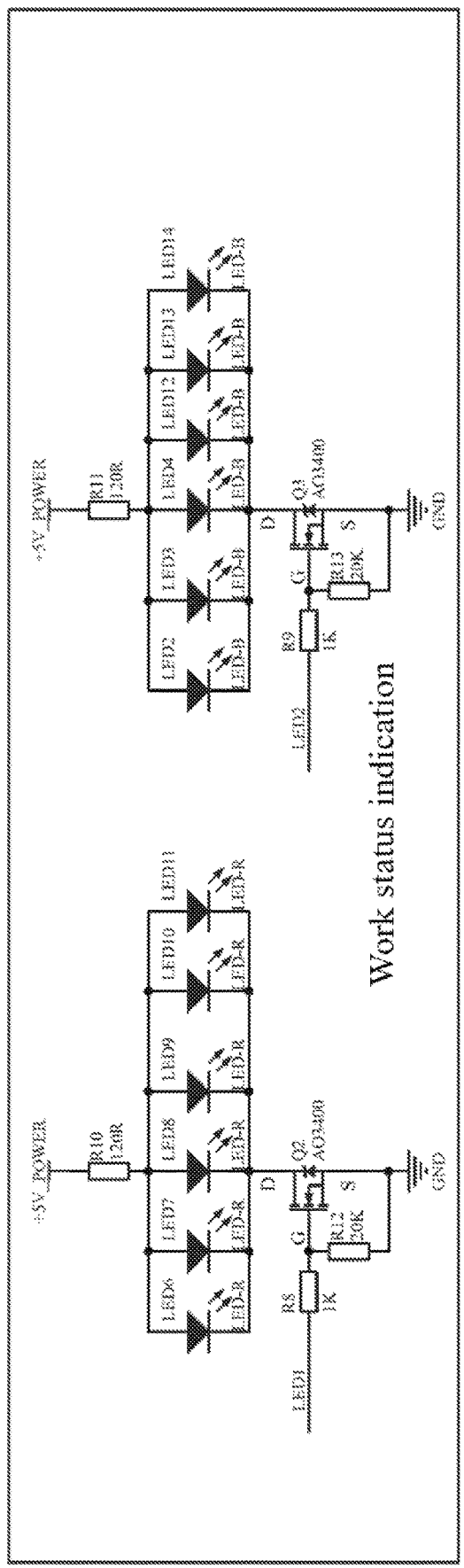
FIG. 7 shows a circuit diagram of an indicator light in an embodiment of the present disclosure.

Referring to FIG. 7, FIG. 7 shows a circuit diagram of the indicator light in this embodiment.

For example, the indicator light 400 in this embodiment includes a red LED light 401 and a blue LED light 402 for indicating different working states of the AI intelligent chip 100.

Specifically, as shown in FIG. 7. R10 and R11 form a current limiting circuit. LED6, LED7, LED8, LED9, LED10, LED11, LED2, LED3, LED4, LED12, LED13, and LED14 are load luminous indicators. R8, R9, R12, R13, Q2, Q3 constitute a lighting state control circuit. Which are used to display different operation states of a machine.

Figure 6:
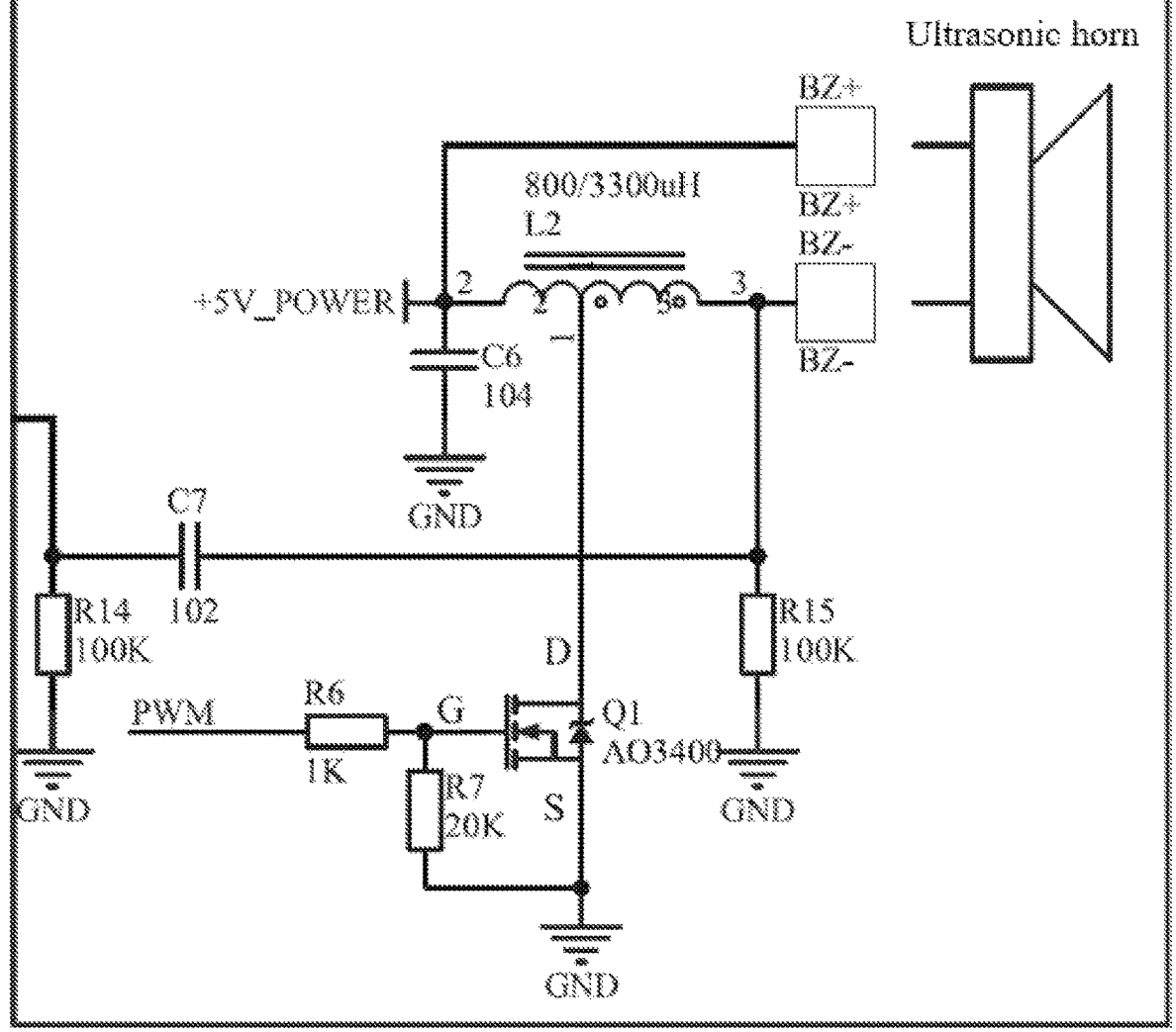
FIG. 6 shows a circuit diagram of a sound wave collector and a sound wave resonator in an embodiment of the present disclosure.

Referring to FIG. 6, FIG. 6 shows a circuit diagram of a sound wave collector and a sound wave resonator in this embodiment.

For example, the ultrasonic horn 500 in this embodiment has a bidirectional function, which collects environmental information under a normal condition and sends it to the AI intelligent chip for calculation. When the AI intelligent chip calculates a corresponding resonance frequency, it switches to an output state. A high-frequency pulse is outputted into space and perform acoustic resonance on a driven object, with signal superposition.

Specifically, the ultrasonic horn 500 includes a sound wave collector 501 and a sound wave resonator 502. As shown in FIGS. 6, L2, C6, Q1, R6, and R7 form an ultrasonic resonance transmission circuit. The high frequency pulse is connected to R6 through a pin 18 of the AI intelligent chip, and then through the Q1MOS transistor and L2 transformer, a low-voltage pulse information is converted into a high-voltage pulse information, which is sent to the ultrasonic horn to convert into a high-frequency ultrasonic pulse sound and radiate into space. A frequency of the high-frequency pulses is 30 KHZ-65 KHZ.

In addition, when an output signal after scanning works at a same frequency as a frequency of a target resonance drive object within a range, it will generate an acoustic resonance effect. The principle of acoustic resonance: defined in physics, any system has its inherent vibration frequency, which is called the natural frequency. When the system is subjected to forced vibration with a same natural frequency as itself, the system amplitude may reach a very large value. In acoustics, acoustic resonance refers to a use of a sound wave with a same natural frequency as the system to excite the system and achieve resonance with the system, which may damage the system's structure.

Specifically, when the machine enters for environmental information collection, the sound passes through the ultrasonic horn, then through R15, C7, R14, and is sent to a $13^{th}$ pin of the AI intelligent chip for environmental information analysis, thereby outputting a corresponding driving pulse. The sound wave collector 501 collects environmental information and sends it to the AI intelligent chip 100 for calculation; the Sound wave resonator 502 is connected to the AI intelligent chip 100 and outputs the high-frequency pulse that resonates with the driven object in space based on the calculation result of the AI intelligent chip 100.

In other embodiments, the sound wave collector 501 is composed of a microcontroller control module, an ultrasonic signal driving circuit, a receiving circuit, a CAN local area network communication module, a parking position status indicator circuit, a power input protection circuit, and a function setting module. The CAN local area network communication module receives an instruction from an upper computer, the microcontroller control module outputs a 40 KHz pulse signal, which is then transmitted through an ultrasonic drive circuit to emit an ultrasonic signal. The signal is amplified by being reflected back to the ultrasonic receiving circuit through air propagation.

For example, the ultrasonic signal driving circuit controls a microcontroller timer to output an oscillation signal of 40 KHz and 50% duty cycle from an output pin of the timer. The oscillation signal is adjusted by a CD4069 inverter to increase an emission intensity and generate resonance in an ultrasonic sensor.

For example, the ultrasonic signal receiving circuit includes a voltage follower, an active bandpass filter, an amplification circuit, and a dual channel comparison shaping circuit, as the ultrasonic signal received by the ultrasonic receiver is very weak and may contain other high-frequency interference signals.

For example, the voltage follower is designed at a back end of the ultrasonic receiving device to avoid a loss of signal energy on an output resistance of a front stage due to a high resistance output of the ultrasonic receiving device when the ultrasonic receiving device is directly connected to the filtering circuit of a rear stage, thereby improving an input impedance of the active bandpass filter.

For example, the active bandpass filter is configured to filter and amplify the output signal of the front stage, as the ultrasonic reflection signal received by the ultrasonic receiver is very weak and may contain other high-frequency interference signals.

For example, the amplification circuit uses a two-stage inverse proportional amplification circuit to further amplify the signal output by the active bandpass filter, with an amplification factor of 10000 times. Thus, the ultrasonic signal has sufficient voltage amplitude to pass through a subsequent comparison shaping circuit.

For example, the dual channel comparison shaping circuit processes the signal output by the amplification circuit into a standard square wave signal, making it convenient for the microcontroller to process. Due to different amplitudes of signals amplified by the active bandpass filters at different reflection distances, the dual channel comparison shaping circuit is used to configure a set of parameters for each channel. The microcontroller automatically selects a measurement circuit, achieving multi range measurement using only one pair of ultrasonic receiver components, thereby improving a measurement accuracy of the system and saving costs.

For example, in the CAN communication module, the microcontroller uses twisted-pair cabling as a transmission line through the CAN communication interface to connect with the CAN local area network and upper computer, achieving networked reporting of status information of various parking spaces in a parking lot and unified management of parking spaces.

For example, the function setting module is connected to a PC through a serial port of the microcontroller, an upper computer software is used to set parameters such as an ultrasonic reflection distance threshold (or time threshold) and a communication address of the collector CAN local area network.

For example, the power input protection circuit, when the power is input in a forward direction, the field-effect transistor conducts and supplies power normally; when the power supply is input in a reverse direction, the field-effect transistor is cut off, a subsequent load will not be damaged; when a forward input current of the power supply is too large, the fuse will burn out, thereby playing a protective role.

In other embodiments, the sound wave resonator 502 includes:
- a piezoelectric substrate, which is a lithium tantalate substrate or lithium niobate substrate and has a thickness of 20 μm or less;
- a supporting substrate with an upper surface bonded to a lower surface of the piezoelectric substrate, a linear thermal expansion coefficient of the supporting substrate is smaller than a linear thermal expansion coefficient of the piezoelectric substrate in X-axis direction; and
- multiple electrode fingers, which are located on an upper surface of the piezoelectric substrate, arranged along the X-axis direction to excite a sound wave, and include a metal film with a thickness being larger or equal to 0.1 time of a wavelength of the sound wave, a linear thermal expansion coefficient of the metal film is less than the linear thermal expansion coefficient of the piezoelectric substrate in the X-axis direction.

Figure 2:
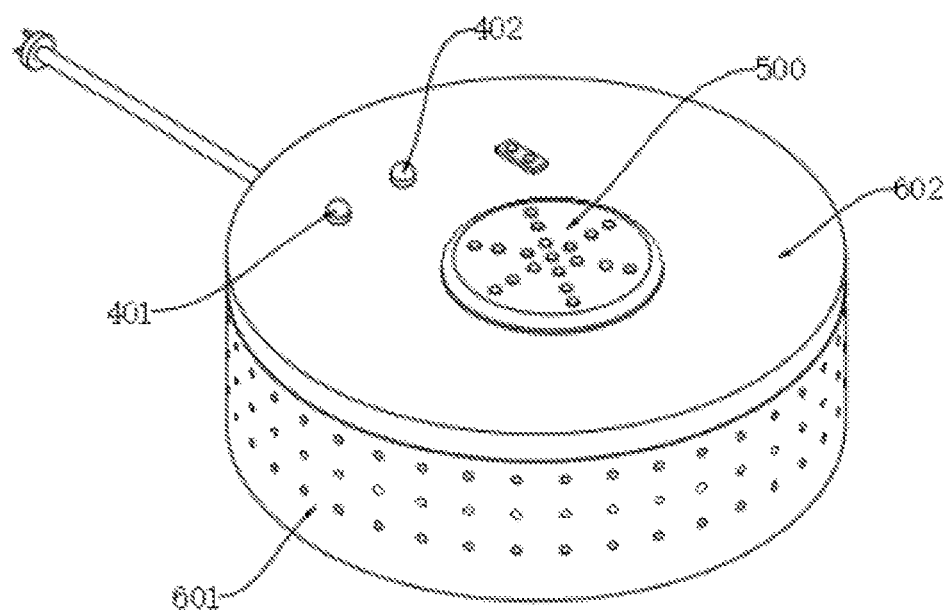
FIG. 2 shows a structural schematic diagram of a casing in an embodiment of the present disclosure.

As shown in FIG. 2, FIG. 2 shows a structural schematic diagram of the casing of the mouse repeller in this embodiment.

For example, the mouse repeller includes a component, a casing 600, a power cord, etc. The component includes the AI intelligent chip 100, the power converter 200, the controller 300, the indicator light 400, and the ultrasonic horn 500 as mentioned above. The casing 600 is configured to install the component and power cord.

Specifically, the casing 600 includes a shell 601; a shell cover 602 connected to a top of the shell 601. The power converter 200 and the controller 300 are both provide in the shell 601, the ultrasonic horn 500 and the indicator light 400 are both provided at a top of the shell cover 602.

Figure 8:
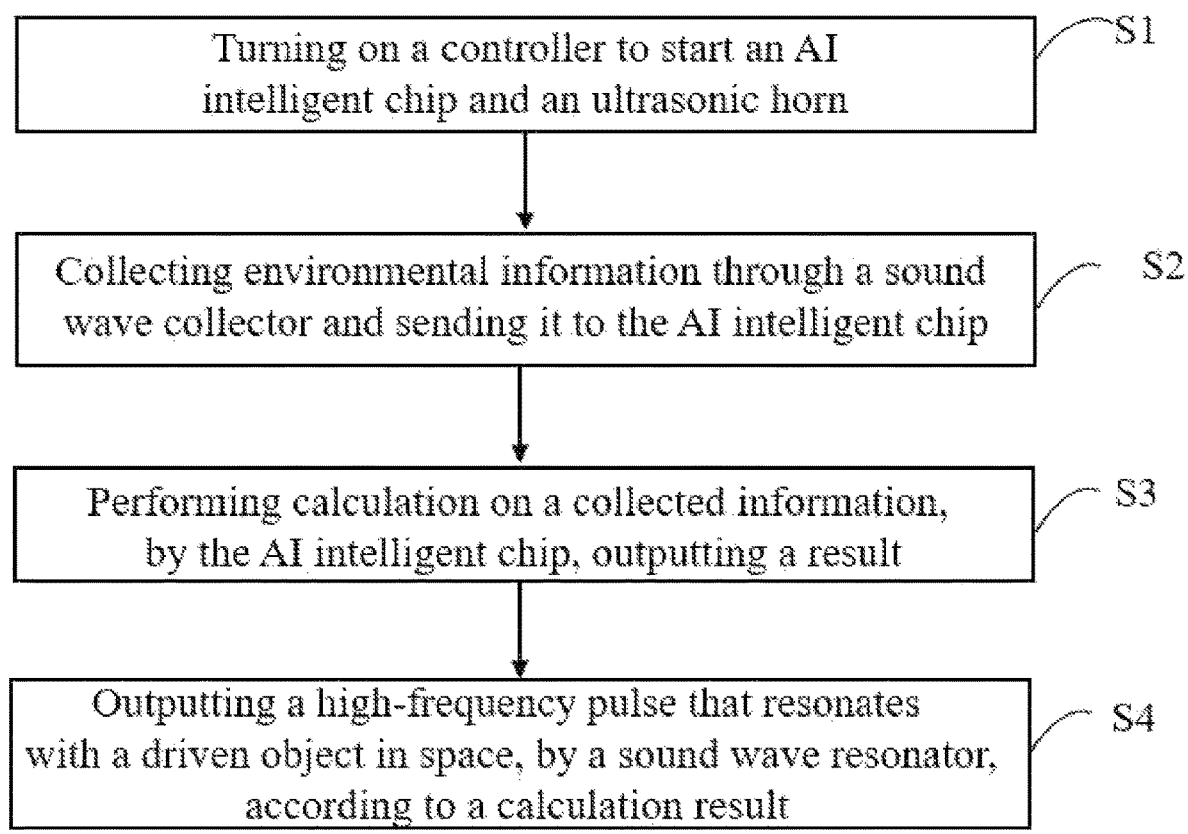
FIG. 8 shows a flowchart of a mouse repellent method of the AI intelligent sound wave pulse resonance mouse repeller according to an embodiment of the present disclosure.

Please refer to FIG. 8, which illustrates a flowchart of a mouse repellent method of the AI intelligent sound wave pulse resonance mouse repeller in an embodiment of the present disclosure.

Exemplary, the mouse repellent method of the AI intelligent sound wave pulse resonance mouse repeller in this embodiment, including the following steps:

S1. Turning on a controller 300 to start an AI intelligent chip 100 and an ultrasonic horn 500.

Specifically, the casing 600 is placed in an open location in small or large warehouses, grain depots, cold storage, supermarkets, farms, garages, and other scenarios; then the power cord is connected to an external power source; the controller 300 is turned on, the power converter 200 works for voltage conversion, and input 3.3V DC voltage to the AI intelligent chip 100.

S2. Collecting environmental information through a sound wave collector 501 and sending it to the AI intelligent chip 100.

Specifically, when the sound wave collector 501 enters for environmental information collection, the sound passes through the ultrasonic horn, then through R15, C7, and R14, and is sent to the 13th pin of the AI intelligent chip for calculation by the information processing program in the AI intelligent chip 100.

S3. Performing calculations on a collected information, by the AI intelligent chip 100, outputting a result;

S4. outputting a high-frequency pulse that resonates with a driven object in space, by a sound wave resonator 502, according to a calculation result;

Specifically, the ultrasonic resonance consisting of L2, C6, Q1, R6, and R7 sends the high-frequency pulse through an $18^{th}$ pin of the AI intelligent chip, which is connected to R6. After passing through the Q1MOS transistor and L2 transformer, the low-voltage pulse information is converted into a high-voltage pulse information, which is sent to the ultrasonic horn to convert into the high-frequency ultrasonic pulse sound and radiate into space.

In this embodiment, the AI variable frequency sound wave pulse resonance technology is mainly adopted. The AI chip can freely generate a high-speed and ultra-high frequency pulse wave with random changes, can perform AI calculation with environmental sound, and then perform random scanning. A generated pulse signal resonates with the sound frequency of animals such as mice and bats, is superimposed with sound waves to achieve state pulses that are tens or even hundreds of times stronger for stimulation and interference, thereby effectively disrupting and stimulating an auditory system of rodents, making them intolerable, feeling panicked and uneasy, exhibiting symptoms such as loss of appetite, escape, and even convulsions, can achieve a goal of driving the rodent out of their range of activity, causing a certain physical damage to a driven object, and improving a driving effect.

Although the present disclosure has been described in detail with reference to the aforementioned embodiments, those skilled in the art should understand that they can still modify the technical solutions recorded in the aforementioned embodiments or equivalently substitute some of the technical features thereof; these modifications or substitutions do not make the essence of the corresponding technical solutions deviate from the spirit and scope of the technical solutions of the various embodiments of the present disclosure.

What is claimed is:

1. An AI intelligent sound wave pulse resonance mouse repeller, comprising:
    an AI intelligent chip, the AI intelligent chip generates randomly varying high-speed ultra-high-frequency pulse waves, performs AI-based computations with environmental sounds, and subsequently executes random scanning;
    a power converter connected to the AI intelligent chip, and configured to provide power support;
    a controller connected to the AI intelligent chip, and configured to control a working mode;
    an indicator light, configured to indicate a working state; and
    an ultrasonic horn connected to the AI intelligent chip, and configured to emit a sound wave pulse;
    wherein the ultrasonic horn comprises a sound wave collector and a sound wave resonator; the sound wave collector collects environmental information and sends it to the AI intelligent chip for calculation; the sound wave resonator is connected to the AI intelligent chip and outputs a high-frequency pulse that resonates with a driven object in space based on a calculation result of the AI intelligent chip, wherein the ultrasonic horn collects environmental information under a normal condition and sends it to the AI intelligent chip for calculation, when the AI intelligent chip calculates a corresponding resonance frequency, and the ultrasonic horn is switched to an output state, and the high-frequency pulse outputs.

2. The AI intelligent sound wave pulse resonance mouse repeller according to claim 1, wherein the AI intelligent chip is provided with a power filtering unit, a program download port is connected to the power filtering unit;
wherein the AI intelligent chip is provided in a casing.

3. The AI intelligent sound wave pulse resonance mouse repeller according to claim 2, wherein the power converter comprises: a connected rectifier bridge, an overvoltage and surge protection circuit, a switch voltage reduction circuit, and a voltage stabilization circuit; wherein the voltage stabilizing circuit is connected to the AI intelligent chip.

4. The AI intelligent sound wave pulse resonance mouse repeller according to claim 3, wherein the controller switches the working state of the AI intelligent chip with a patch type button.

5. The AI intelligent sound wave pulse resonance mouse repeller according to claim 4, wherein the indicator light comprises a red LED light and a blue LED light for indicating different working states of the AI intelligent chip.

6. The AI intelligent sound wave pulse resonance mouse repeller according to claim 5, wherein the casing comprises:
a shell;
a shell cover connected to a top of the shell;
wherein the power converter and the controller are both provided in the shell, the ultrasonic horn and the indicator light are provided at a top of the shell cover.

7. A mouse repellent method of the AI intelligent sound wave pulse resonance mouse repeller according to claim 1, the method comprises:
turning on the controller to start the AI intelligent chip and the ultrasonic horn;
collecting environmental information through the sound wave collector and sending it to the AI intelligent chip;
performing calculation on a collected information, by the AI intelligent chip, outputting the result;
outputting a high-frequency pulse that resonates with a driven object in space, by the sound wave resonator, according to a calculation result.

8. The mouse repellent method according to claim 7, wherein the AI intelligent chip is provided with an information computing program.

9. The mouse repellent method according to claim 7, wherein a frequency of the high-frequency pulse is between 30 KHZ-65 KHZ.

10. The AI intelligent sound wave pulse resonance mouse repeller according to claim 1, wherein a frequency of the high-frequency pulse is between 30 KHZ-65 KHZ.

11. The AI intelligent sound wave pulse resonance mouse repeller according to claim 1, wherein the sound wave collector comprises a microcontroller control module, an ultrasonic signal driving circuit, a CAN local area network communication module, the CAN local area network communication module receives an instruction from an upper computer, the microcontroller control module outputs a pulse signal, which is then transmitted through an ultrasonic drive circuit to emit an ultrasonic signal, and the signal is amplified by being reflected back to the ultrasonic receiving circuit through air propagation.

12. The AI intelligent sound wave pulse resonance mouse repeller according to claim 1, wherein the sound wave resonator comprises:
a piezoelectric substrate, which is a lithium tantalate substrate or lithium niobate substrate;
a supporting substrate with an upper surface bonded to a lower surface of the piezoelectric substrate, a linear thermal expansion coefficient of the supporting substrate is smaller than a linear thermal expansion coefficient of the piezoelectric substrate in an X-axis direction; and
multiple electrode fingers, which are located on an upper surface of the piezoelectric substrate, arranged along the X-axis direction to excite a sound wave.

13. The AI intelligent sound wave pulse resonance mouse repeller according to claim 12, wherein the sound wave resonator further comprises a metal film with a thickness being larger or equal to 0.1 time of a wavelength of the sound wave, a linear thermal expansion coefficient of the metal film is less than the linear thermal expansion coefficient of the piezoelectric substrate in the X-axis direction.

* * * * *